(12) United States Patent
Iwazaki

(10) Patent No.: US 11,750,117 B2
(45) Date of Patent: Sep. 5, 2023

(54) CONTROL METHOD FOR PIEZOELECTRIC MOTOR AND ROBOT

(71) Applicant: SEIKO EPSON CORPORATION, Tokyo (JP)

(72) Inventor: Tomohisa Iwazaki, Shimosuwa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 12 days.

(21) Appl. No.: 17/665,611

(22) Filed: Feb. 7, 2022

(65) Prior Publication Data
US 2022/0255470 A1   Aug. 11, 2022

(30) Foreign Application Priority Data

Feb. 9, 2021 (JP) ................... 2021-018925

(51) Int. Cl.
*H02N 2/14* (2006.01)
*H02N 2/10* (2006.01)
*B25J 9/12* (2006.01)

(52) U.S. Cl.
CPC ............... *H02N 2/142* (2013.01); *B25J 9/12* (2013.01); *H02N 2/103* (2013.01)

(58) Field of Classification Search
CPC ........ H02N 2/142; H02N 2/103; H02N 2/004; B25J 9/12
See application file for complete search history.

(56) References Cited

U.S. PATENT DOCUMENTS 6,771,004 B1 * 8/2004 Matsuda ............... H02N 2/0025
310/317
10,493,619 B2 * 12/2019 Miyazawa ................. B25J 9/12

FOREIGN PATENT DOCUMENTS

JP        2018068112 A    4/2018

* cited by examiner

*Primary Examiner* — Emily P Pham
(74) *Attorney, Agent, or Firm* — Gang Yu

(57) ABSTRACT

A piezoelectric motor includes a driven member rotating around a rotation axis, and a plurality of piezoelectric vibrators rotating the driven member by transmitting drive forces to the driven member. The plurality of piezoelectric vibrators includes a first piezoelectric vibrator and a second piezoelectric vibrator at a larger distance from the rotation axis than the first piezoelectric vibrator. The control method for the driven member includes, for acceleration of the driven member, rotating the driven member by the drive force of the second piezoelectric vibrator when a rotation velocity of the driven member is lower than a first velocity, and rotating the driven member by the drive force of the first piezoelectric vibrator when the rotation velocity of the driven member is equal to or higher than the first velocity.

9 Claims, 12 Drawing Sheets

CONTROL METHOD FOR PIEZOELECTRIC MOTOR AND ROBOT

The present application is based on, and claims priority from JP Application Serial Number 2021-018925, filed Feb. 9, 2021, the disclosure of which is hereby incorporated by reference herein in its entirety.

BACKGROUND

1. Technical Field

The present disclosure relates to a control method for a piezoelectric motor and a robot.

2. Related Art

For example, JP-A-2018-068112 discloses a vibrating actuator having three vibrators placed on the same circumference at equal intervals and a ring-shaped driven member rotating by driving of these three vibrators.

In the vibrating actuator of JP-A-2018-068112, the three vibrator portions are located on the same circumference. Accordingly, with the larger diameter of the driven member, the vibrating actuator is suitable for higher torque/lower velocity and, with the smaller diameter of the driven member, the vibrating actuator is suitable for lower torque/higher velocity. Therefore, it is difficult to drive with good energy efficiency over the entire of the wide velocity range.

SUMMARY

A control method for a piezoelectric motor according to an aspect of the present disclosure is a control method for a piezoelectric motor including a driven member rotating around a rotation axis, and a plurality of piezoelectric vibrators rotating the driven member by transmitting drive forces to the driven member. The plurality of piezoelectric vibrators includes a first piezoelectric vibrator and a second piezoelectric vibrator at a larger distance from the rotation axis than the first piezoelectric vibrator. The control method includes, for acceleration of the driven member, rotating the driven member by the drive force of the second piezoelectric vibrator when a rotation velocity of the driven member is lower than a first velocity, and rotating the driven member by the drive force of the first piezoelectric vibrator when the rotation velocity of the driven member is equal to or higher than the first velocity.

A robot according to an aspect of the present disclosure includes a first member and a second member coupled to each other, and a piezoelectric motor driven under control by the above described control method, and displacing the second member relative to the first member.

DESCRIPTION OF EXEMPLARY EMBODIMENTS

As below, a control method for a piezoelectric motor and a robot according to the present disclosure will be explained in detail based on preferred embodiments shown in the accompanying drawings.

First Embodiment

Figure 1:
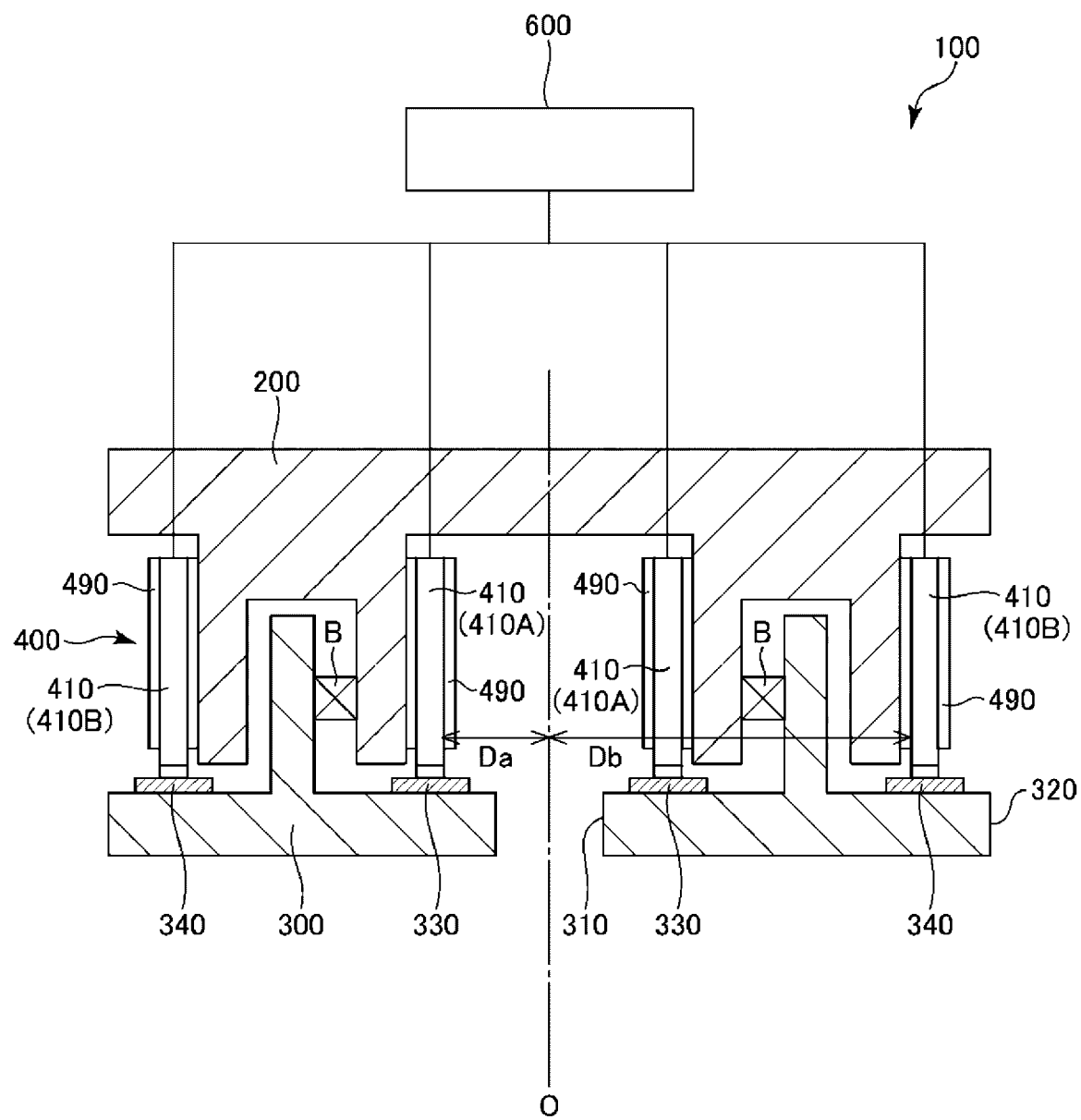
FIG. 1 is a sectional view showing a piezoelectric motor according to a first embodiment of the present disclosure.
Figure 2:
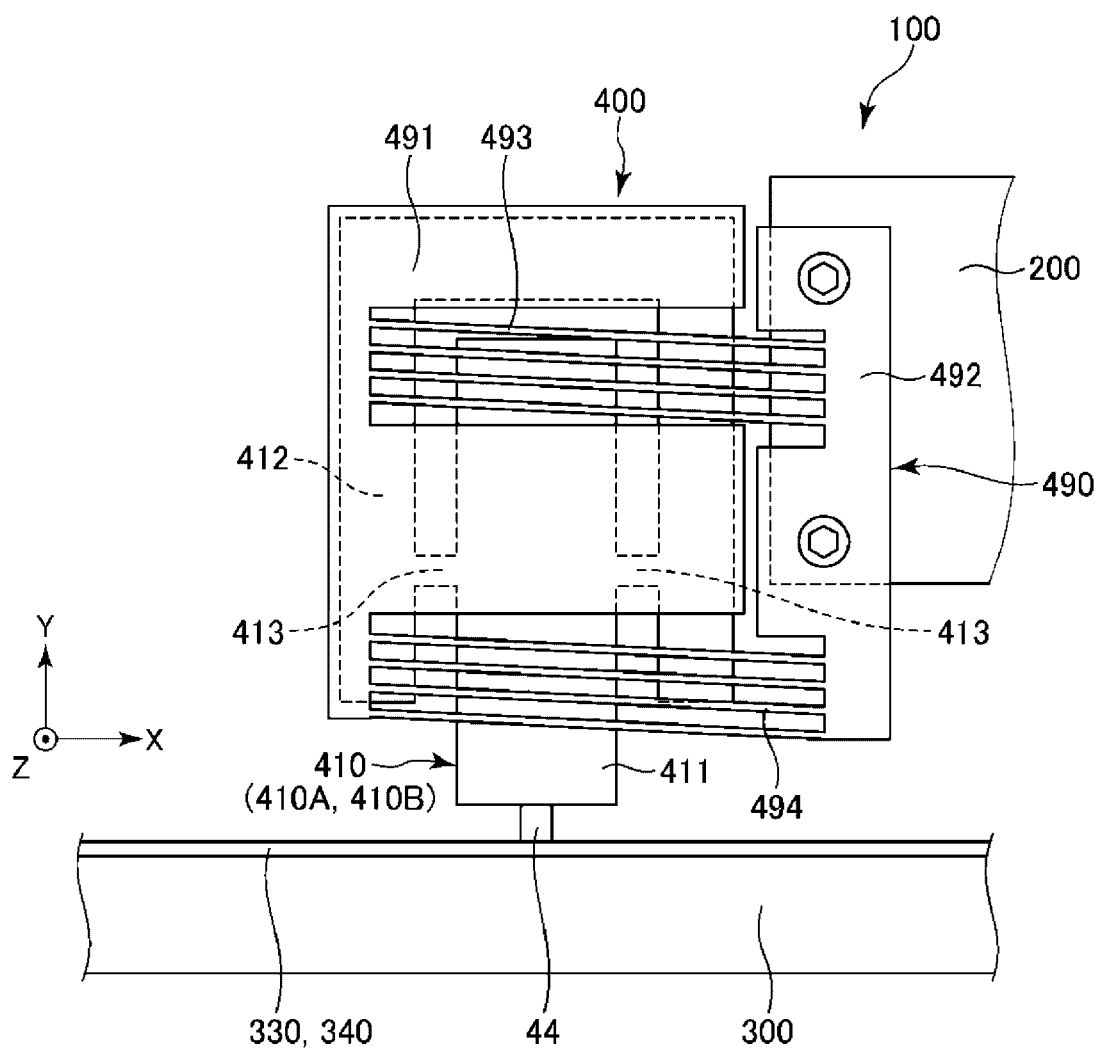
FIG. 2 is a front view showing a piezoelectric drive device of the piezoelectric motor.
Figure 3:
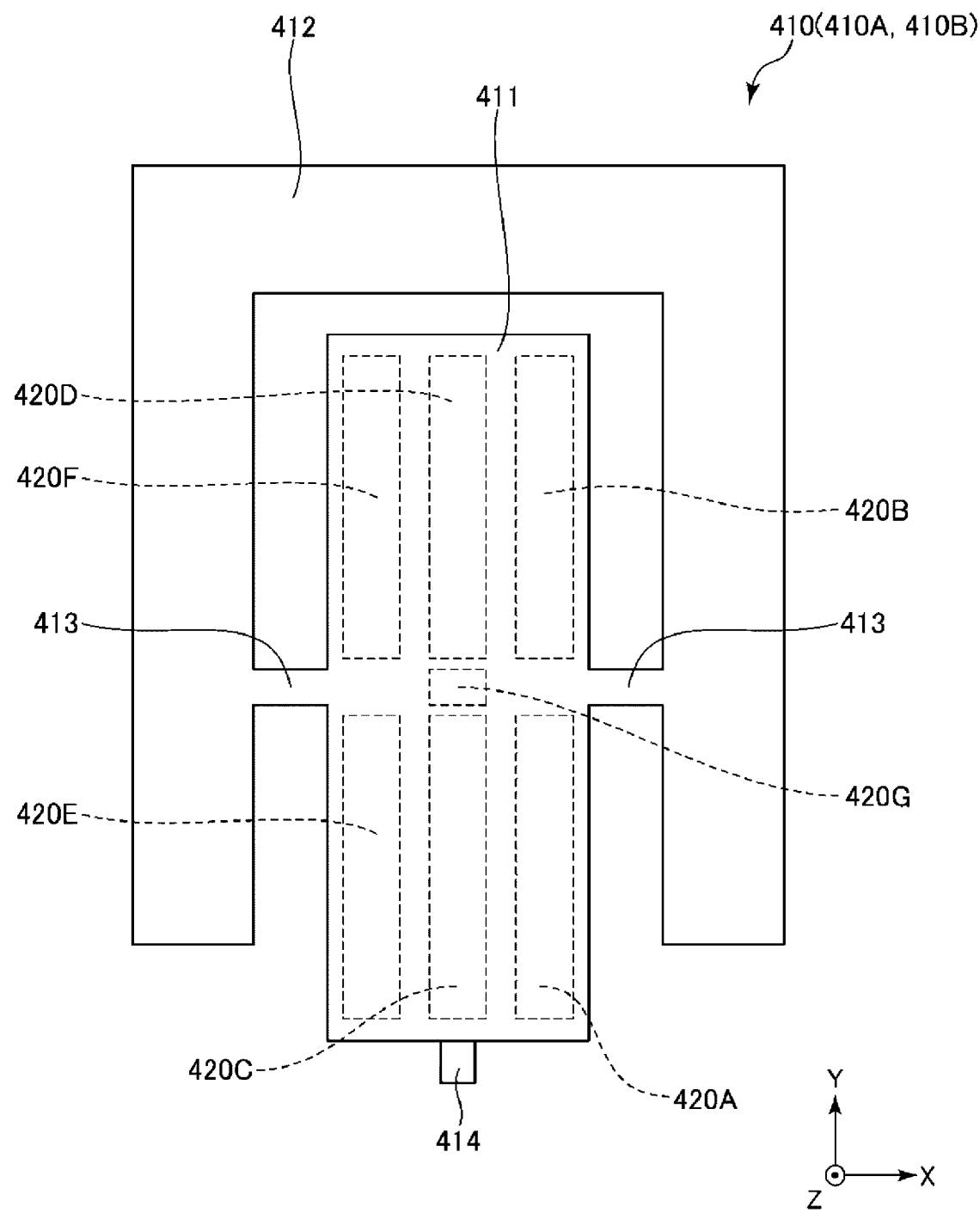
FIG. 3 is a front view showing a piezoelectric vibrator of the piezoelectric drive device.
Figure 4:
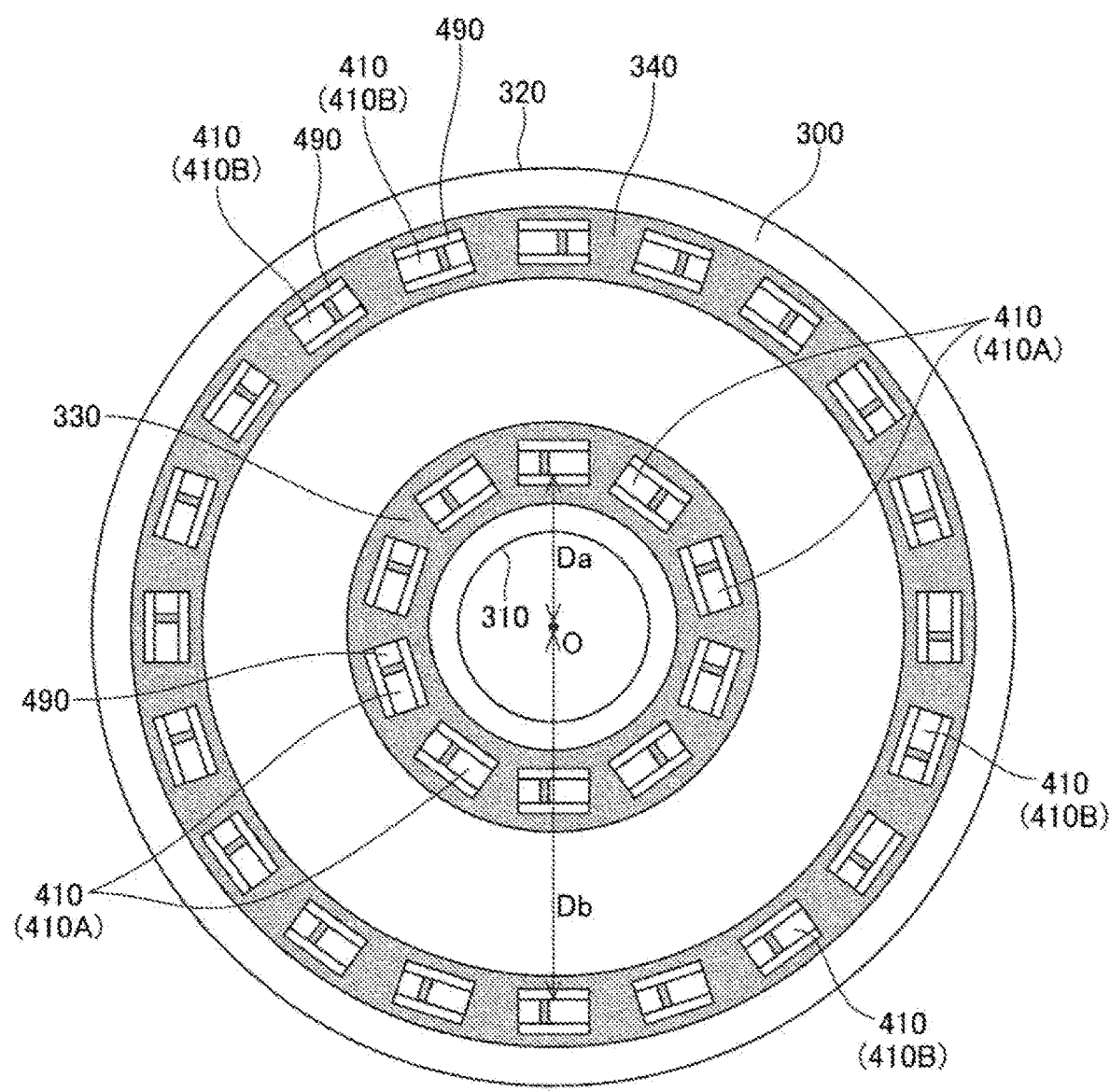
FIG. 4 is a plan view of the piezoelectric drive device as seen from a direction along a rotation axis.
Figure 5:
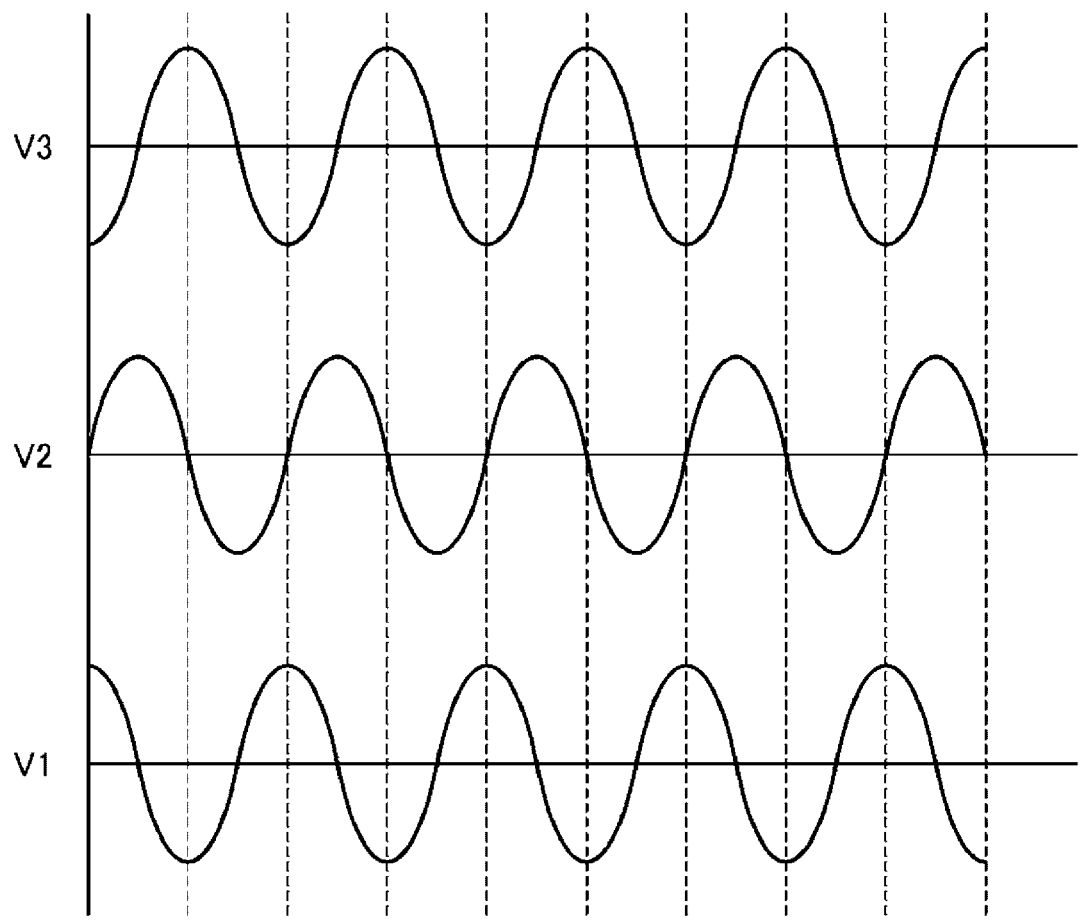
FIG. 5 shows drive signals applied to the piezoelectric vibrator.
Figure 6:
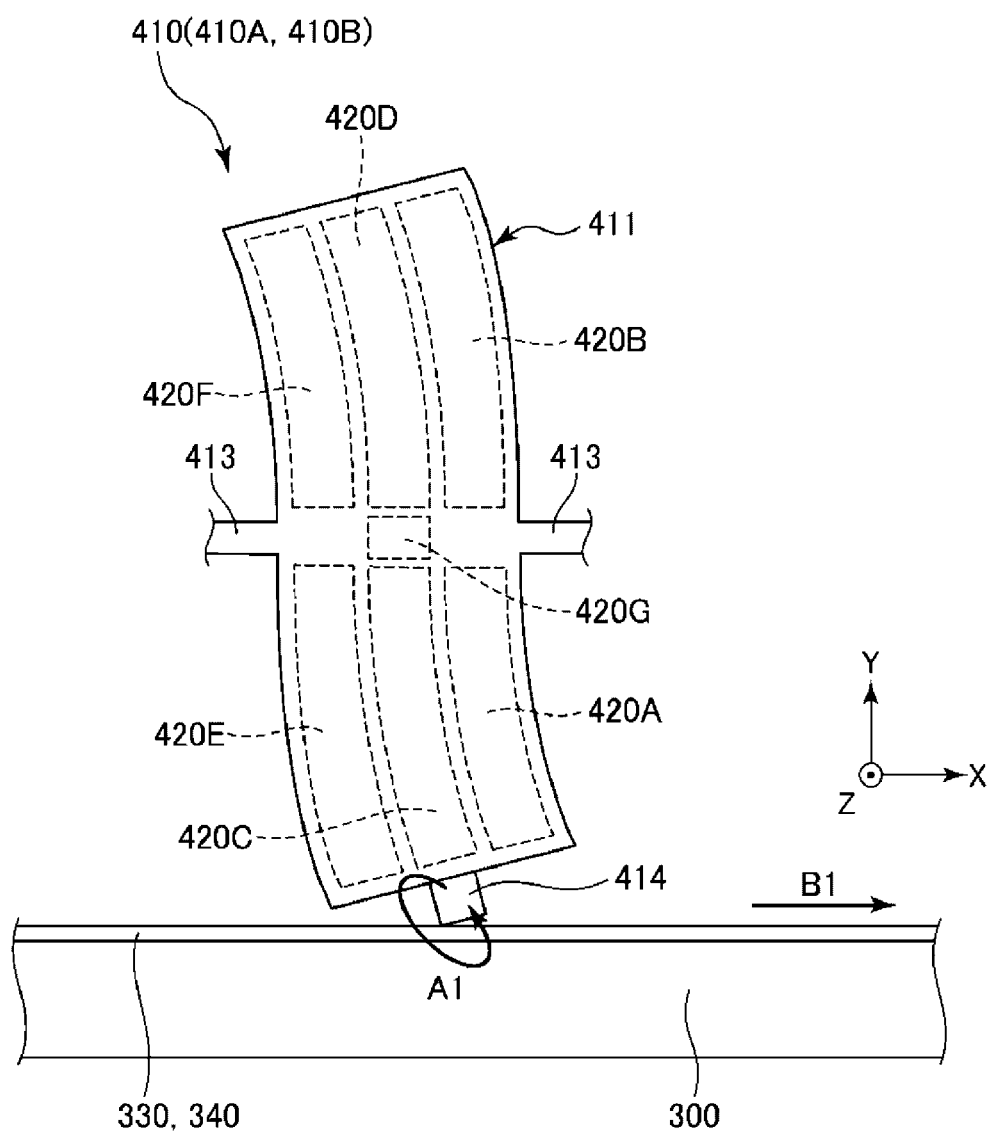
FIG. 6 is a front view showing a drive state of the piezoelectric vibrator.
Figure 7:
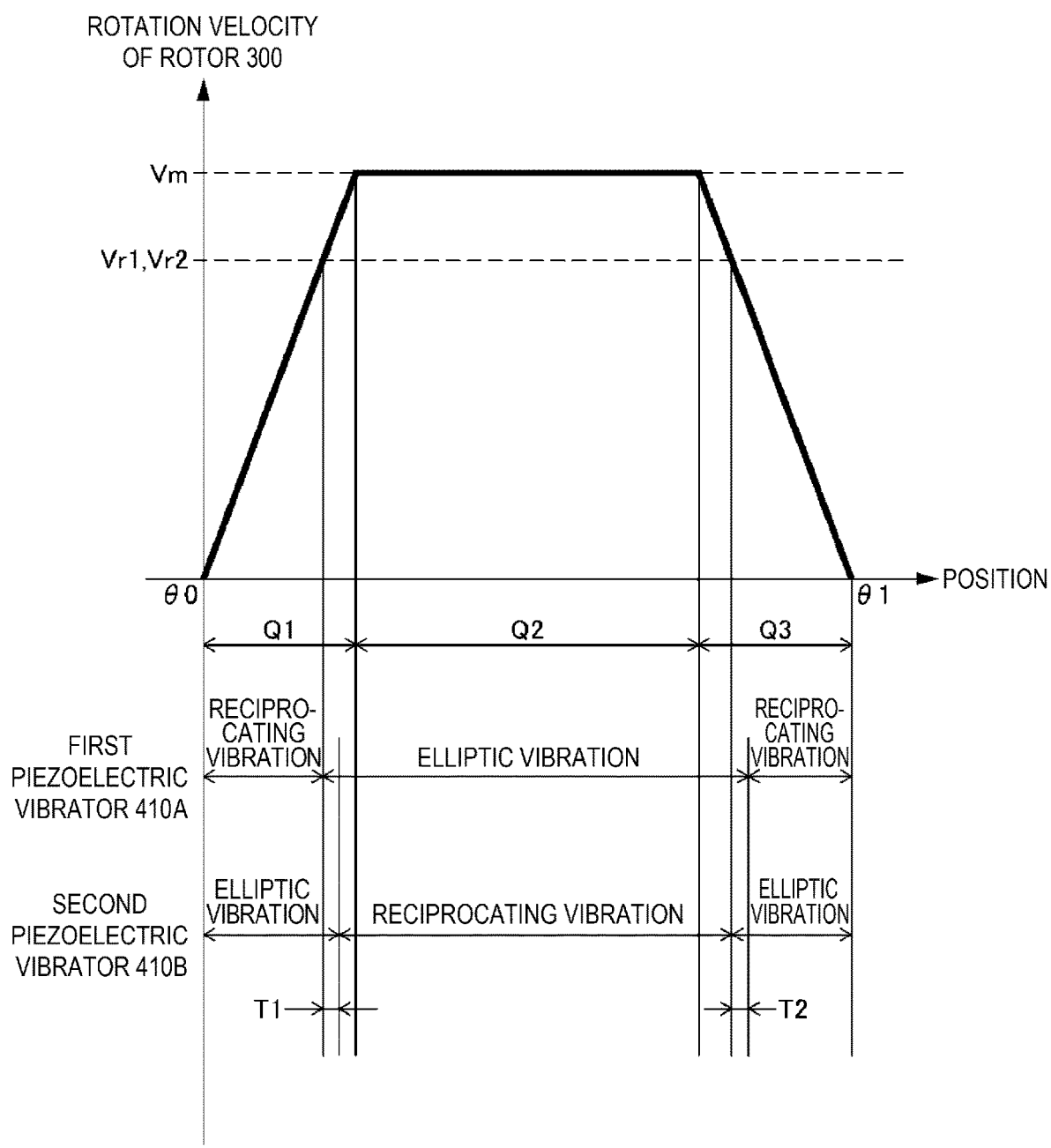
FIG. 7 shows a control method for the piezoelectric motor.
Figure 8:
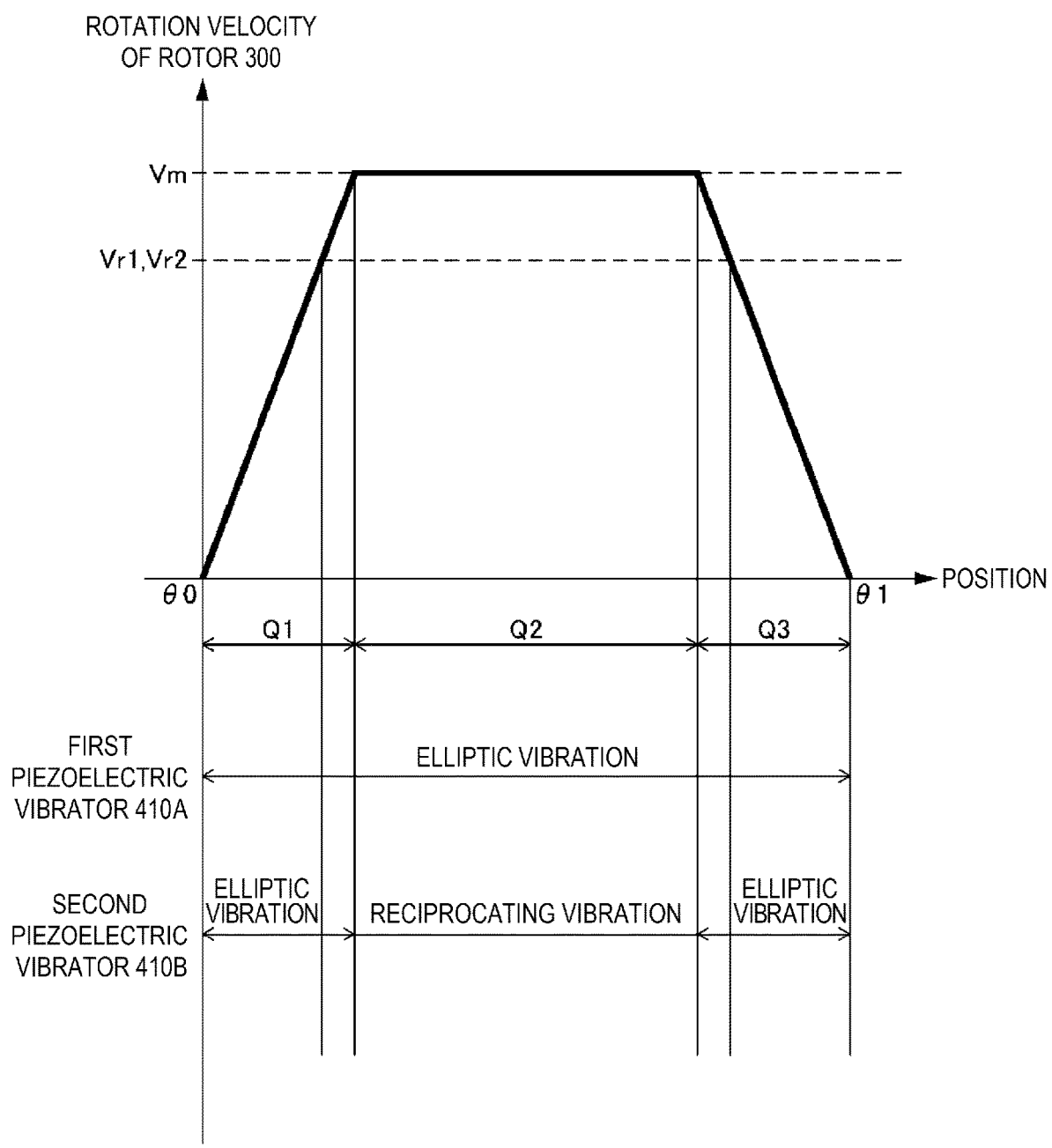
FIG. 8 shows the control method for the piezoelectric motor.

FIG. 1 is a sectional view showing a piezoelectric motor according to a first embodiment of the present disclosure. FIG. 2 is a front view showing a piezoelectric drive device of the piezoelectric motor. FIG. 3 is a front view showing a piezoelectric vibrator of the piezoelectric drive device. FIG. 4 is a plan view of the piezoelectric drive device as seen from a direction along a rotation axis. FIG. 5 shows drive signals applied to the piezoelectric vibrator. FIG. 6 is a front view showing a drive state of the piezoelectric vibrator. FIGS. 7 and 8 respectively show a control method for the piezoelectric motor.

Hereinafter, for convenience of explanation, a rotor side of a piezoelectric vibrator is also referred to as "distal end side" and the opposite side to the rotor is also referred to as "proximal end side". As coordinate axes specific to the piezoelectric vibrator, three axes orthogonal to one another are an X-axis, a Y-axis, and a Z-axis, and directions along the X-axis are also referred to as "X-axis directions", directions along the Y-axis are also referred to as "Y-axis directions", and directions along the Z-axis are also referred to as "Z-axis directions". Further, the arrow-head sides of the respective axes are also referred to as "plus sides", and the opposite sides to the arrow-heads are also referred to as "minus sides". In this specification, "less than/equal to or more than" and "equal to or less than/more than" are used for the same meaning.

A piezoelectric motor 100 shown in FIG. 1 has a base 200, a rotor 300 as a driven member rotatable around a rotation axis O relative to the base 200, a piezoelectric drive device 400 rotating the rotor 300 around the rotation axis O, an encoder (not shown) detecting an amount of rotation of the rotor 300, and a control apparatus 600 controlling driving of the piezoelectric drive device 400. In the piezoelectric motor 100, the piezoelectric drive device 400 drives under control by the control apparatus 600, a drive force generated in the piezoelectric drive device 400 is transmitted to the rotor 300, and thereby, the rotor 300 rotates around the rotation axis O.

The rotor 300 is axially supported by the base 200 via a bearing B and rotatable around the rotation axis O relative to the base 200. Further, the rotor 300 has an annular shape around the rotation axis O and has an inner circumference 310 and an outer circumference 320. The base 200 has two contact portions 330, 340 placed on the upper surface thereof. The contact portion 330 has an annular shape around the rotation axis O and is placed along the inner circumference 310. The contact portion 340 has an annular shape around the rotation axis O and is placed along the outer circumference 320. The piezoelectric drive device 400 contacts these two contact portions 330, 340.

The piezoelectric drive device 400 has a plurality of piezoelectric vibrators 410 and urging members 490 urging the respective piezoelectric vibrators 410 toward the rotor 300. As shown in FIG. 2, each piezoelectric vibrator 410 has a vibrating portion 411, a supporting portion 412 supporting the vibrating portion 411, a coupling portion 413 coupling the vibrating portion 411 and the supporting portion 412, and a transmitting portion 414 having a convex shape and transmitting vibration of the vibrating portion 411 to the rotor 300.

As shown in FIG. 3, the vibrating portion 411 has a plate shape having a thickness direction in the Z-axis direction and spreading in the XY-plane containing the X-axis and the Y-axis. The vibrating portion 411 has an elongated shape elongated in the Y-axis directions, particularly, a rectangular shape in the embodiment in a plan view. Note that the shape of the vibrating portion 411 is not particularly limited as long as the portion may fulfill the function thereof. Further, the vibrating portion 411 has drive piezoelectric elements 420A to 420F and a detection piezoelectric element 420G detecting the vibration of the vibrating portion 411. In the center part of the vibrating portion 411, the piezoelectric elements 420C, 420D are adjoiningly placed in the Y-axis directions. The piezoelectric elements 420A, 420B are adjoiningly placed in the Y-axis directions at the plus side in the X-axis direction of the piezoelectric elements 420C, 420D, and the piezoelectric elements 420E, 420F are adjoiningly placed in the Y-axis directions at the minus side in the X-axis direction. These piezoelectric elements 420A to 420F respectively expand and contract in the Y-axis directions by energization. Note that the number and the placement of the drive piezoelectric elements are not particularly limited as long as the elements may excite desirable vibration in the vibrating portion 411.

The detection piezoelectric element 420G is placed between the piezoelectric elements 420C, 420D. The piezoelectric element 420G is subjected to an external force according to the vibration of the vibrating portion 411 and outputs a detection signal according to the applied external force. Accordingly, the vibration state of the vibrating portion 411 may be sensed based on the detection signal output from the piezoelectric element 420G. Note that the number and the placement of the detection piezoelectric element are not particularly limited as long as the element may detect the vibration of the vibrating portion 411. Or, the detection piezoelectric element may be omitted.

These piezoelectric elements 420A to 420F have e.g. configurations in which piezoelectric materials are sandwiched by pairs of electrodes. The constituent material of the piezoelectric material is not particularly limited, but piezoelectric ceramics including e.g. lead zirconate titanate (PZT), barium titanate, lead titanate, potassium niobate, lithium niobate, lithium tantalate, sodium tungstate, zinc oxide, barium strontium titanate (BST), strontium bismuth tantalate (SBT), lead metaniobate, and lead scandium niobate may be used. As the piezoelectric material, not only the above described piezoelectric ceramics but also polyvinylidene fluoride, quartz crystal, or the like may be used. The method of forming the piezoelectric material is not particularly limited, but the material may be formed from a bulk material or using the sol-gel method or the sputtering method.

The transmitting portion 414 is provided in the distal end part of the vibrating portion 411 and projects from the vibrating portion 411 toward the minus side in the Y-axis direction. The transmitting portion 414 contacts the contact portions 330, 340 of the rotor 300. Accordingly, the vibration of the vibrating portion 411 is transmitted to the rotor 300 via the transmitting portion 414.

As above, the configuration of the piezoelectric vibrator 410 is explained. As shown in FIGS. 1 and 4, these plurality of piezoelectric vibrators 410 include first piezoelectric vibrators 410A and second piezoelectric vibrators 410B. The first piezoelectric vibrator 410A is placed to face the contact portion 330 and the transmitting portion 414 thereof contacts the contact portion 330. On the other hand, the second piezoelectric vibrator 410B is placed to face the contact portion 340 and the transmitting portion 414 thereof contacts the contact portion 340. Accordingly, a separation distance Db between the second piezoelectric vibrator 410B and the rotation axis O is larger than a separation distance Da between the first piezoelectric vibrator 410A and the rotation axis O. That is, Db>Da.

Further, as shown in FIG. 4, a plurality of the first piezoelectric vibrators 410A are placed at equal intervals around the rotation axis O along the contact portion 330. Similarly, a plurality of the second piezoelectric vibrator 410B are placed at equal intervals around the rotation axis O along the contact portion 340. The pluralities of the first piezoelectric vibrators 410A and the second piezoelectric vibrators 410B are placed, and thereby, a larger drive force may be generated. Note that the numbers of the first piezoelectric vibrators 410A and the second piezoelectric vibrators 410B are respectively not particularly limited, but may be ones. The numbers of the first piezoelectric vibrators 410A and the second piezoelectric vibrators 410B may be the same or different. The inner circumference 310 is shorter than the outer circumference 320, and accordingly, in the embodiment, the number (10) of first piezoelectric vibrators 410A is smaller than the number (20) of second piezoelectric vibrators 410B.

As shown in FIG. 2, the urging member 490 is placed with respect to each piezoelectric vibrator 410. The urging member 490 urges the piezoelectric vibrator 410 toward the rotor 300 and presses the transmitting portion 414 against the contact portion 330, 340. The urging member 490 has a holding portion 491 holding the supporting portion 412 of the piezoelectric vibrator 410, a base 492 fixing the piezoelectric vibrator 410 to the base 200, and a pair of spring groups 493, 494 coupling the holding portion 491 and the base 492. The urging member 490 is fixed to the base 200 with the spring groups 493, 494 pressed and urges the piezoelectric vibrator 410 toward the contact portion 330, 340 using restoring forces of the spring groups 493, 494. Note that the configuration of the urging member 490 is not particularly limited.

The control apparatus 600 includes e.g. a computer and has a processor that processes information, a memory communicably coupled to the processor, and an external interface. Further, programs that can be executed by the processor are stored in the memory and the processor reads and executes the programs stored in the memory. The control apparatus 600 receives a command from a host computer (not shown) and drives the respective piezoelectric vibrators 410 based on the command. Note that, in the embodiment, all of the first piezoelectric vibrators 410A are integrally controlled and all of the second piezoelectric vibrators 410B are integrally controlled. Thereby, the apparatus configuration is simpler. Note that, not limited to that, but, for example, all of the piezoelectric vibrators 410 may be independently controlled. Or, for example, the first piezoelectric vibrators 410A may be divided into a plurality of groups and independently controlled with respect to each group. Similarly, the second piezoelectric vibrators 410B may be divided into a plurality of groups and independently controlled with respect to each group.

For example, when a drive signal V1 shown in FIG. 5 is applied to the piezoelectric elements 420A, 420F, a drive signal V2 is applied to the piezoelectric elements 420C, 420D, and a drive signal V3 is applied to the piezoelectric elements 420B, 420E, as shown in FIG. 6, the vibrating portion 411 flexurally vibrates in the Z-axis directions while stretchingly vibrating in the Y-axis directions, and these vibrations are synthesized and the distal end of the transmitting portion 414 makes an elliptic motion tracing an elliptic trajectory counterclockwise as shown by an arrow A1. Then, the rotor 300 is turned around by the elliptic motion of the transmitting portion 414, and the rotor 300 rotates forward as shown by an arrow B1. When the waveforms of the drive signals V1, V3 are switched, the rotor 300 rotates backward. Note that "elliptic motion" refers to not only a motion having a trajectory coinciding with an ellipse but also e.g. a motion having a trajectory of e.g. a circle or an oval slightly different from the ellipse.

Hereinafter, for convenience of explanation, the stretching vibration of the vibrating portion 411 in the Y-axis directions is also referred to as "reciprocating vibration" and the flexural vibration in the X-axis directions is also referred to as "flexural vibration". The reciprocating vibration is excited by application of the drive signal V2 to the piezoelectric elements 420C, 420D, and the flexural vibration is excited by application of the drive signals V1, V3 to the piezoelectric elements 420A, 420B, 420E, 420F. Accordingly, the reciprocating vibration is controlled by the drive signal V2 and the flexural vibration is controlled by the drive signals V1, V3.

Next, a drive control method for the piezoelectric motor 100 by the control apparatus 600 will be explained representatively using an example in which the rotor 300 is rotationally moved from a rotation position $\theta 0$ to a rotation position $\theta 1$ as shown in FIG. 7. During the rotational movement from the rotation position $\theta 0$ to the rotation position $\theta 1$, there are an acceleration area Q1 in which the rotor 300 is accelerated from a stop state to a target maximum velocity Vm, a constant velocity area Q2 in which the rotor 300 is kept at the target maximum velocity Vm, and a deceleration area Q3 in which the rotor 300 is decelerated from the target maximum velocity Vm to the stop state.

Here, as described above, the separation distance Db between the second piezoelectric vibrator 410B and the rotation axis O is larger than the separation distance Da between the first piezoelectric vibrator 410A and the rotation axis O. Accordingly, when the power consumption is the same (that is, the drive signals V1, V2, V3 have the same amplitude), the second piezoelectric vibrator 410B may rotate the rotor 300 with higher torque than that of the first piezoelectric vibrator 410A and the first piezoelectric vibrator 410A may rotate the rotor 300 at the higher velocity than that of the second piezoelectric vibrator 410B. Therefore, like a transmission of a vehicle, for example, the piezoelectric vibrators 410 to drive are selected from the first piezoelectric vibrators 410A and the second piezoelectric vibrators 410B according to the necessary rotation velocity and the necessary torque, and thereby, the optimal drive state may be selected and good drive efficiency may be exerted.

Acceleration Area Q1

First, the control apparatus 600 elliptically vibrates the second piezoelectric vibrators 410B. Thereby, the rotor 300 may be rotated with higher torque and the rotor 300 in the stop state may be smoothly accelerated. Further, the rotor 300 may be rotated with higher energy efficiency than that in a case using the elliptic vibration of the first piezoelectric vibrators 410A, and power-saving drive of the piezoelectric motor 100 can be realized.

Note that the respective piezoelectric vibrators 410 are pressed against the contact portions 330, 340 by the urging members 490. Accordingly, if the first piezoelectric vibrators 410A remain at rest, the first piezoelectric vibrators 410A may act as brakes and the acceleration of the rotor 300 may be hindered. On this account, the control apparatus 600 reciprocatingly vibrates the first piezoelectric vibrators 410A. Thereby, the transmitting portions 414 of the first piezoelectric vibrators 410A repeatedly contact and separate from the contact portion 330 and the brakes are substantially released. Therefore, the rotor 300 may be smoothly accelerated by the elliptic vibration of the second piezoelectric vibrators 410B and energy loss becomes lower.

When the rotation velocity, i.e., the angular velocity of the rotor 300 is equal to or higher than a first velocity Vr1 that is set in advance, the control apparatus 600 switches the piezoelectric vibrators 410 serving to drive the rotor 300 from the second piezoelectric vibrators 410B to the first piezoelectric vibrators 410A. That is, when the rotation velocity of the rotor 300 becomes equal to or higher than the first velocity Vr1, the vibration of the first piezoelectric vibrators 410A is changed from the reciprocating vibration to the elliptic vibration and the vibration of the second piezoelectric vibrators 410B is changed from the elliptic vibration to the reciprocating vibration. Note that the rotation velocity of the rotor 300 may be detected using output of the encoder (not shown). Thereby, the rotor 300 may be rotated at a higher velocity and the rotor 300 may be smoothly accelerated. Further, the rotor 300 may be rotated with higher energy efficiency than that in a case using the elliptic vibration of the second piezoelectric vibrators 410B and accelerating without change, and power-saving drive of the piezoelectric motor 100 can be realized.

The vibration of the second piezoelectric vibrators 410B is changed from the elliptic vibration to the reciprocating vibration for the same reason as described above in order to suppress the second piezoelectric vibrators 410B serving as brakes.

The first velocity Vr1 is not particularly limited, but may be appropriately set so that the energy efficiency may be better based on the values of the separation distances Da, Db. Further, the first velocity Vr1 may be constant or change according to e.g. a designated acceleration. For example, the control apparatus 600 may set the first velocity Vr1 to be higher as the designated acceleration is higher. Thereby, the second piezoelectric vibrators 410B may be used to the higher velocity range and the rotor may be accelerated steeply to the higher velocity.

In the embodiment, when the piezoelectric vibrators 410 serving to drive the rotor 300 are switched from the second piezoelectric vibrators 410B to the first piezoelectric vibrators 410A, a time period T1 in which both the first and second piezoelectric vibrators 410A and 410B elliptically vibrate is provided. That is, even when the rotation velocity of the rotor 300 is equal to or higher than the first velocity Vr1, the elliptic vibration of the second piezoelectric vibrators 410B is continued after the first piezoelectric vibrators 410A are elliptically vibrated for a predetermined time or until the rotation velocity of the rotor 300 becomes equal to or higher than a predetermined value. The time period T1 is provided, and thereby, the vibrators may be switched from the second piezoelectric vibrators 410B to the first piezoelectric vibrators 410A without interruption of power. Accordingly, the power can be smoothly switched.

After the piezoelectric vibrators 410 serving to drive the rotor 300 are switched to the first piezoelectric vibrators 410A, the rotor 300 is accelerated to the target maximum velocity Vm by the elliptic vibration of the first piezoelectric vibrators 410A.

Constant Velocity Area Q2

In the constant velocity area Q2, the control apparatus 600 keeps the rotation velocity of the rotor 300 at the target maximum velocity Vm.

Deceleration Area Q3

In the deceleration area Q3, the rotor 300 is decelerated in the reverse procedure to that in the above described acceleration area Q1. First, the control apparatus 600 gradually decreases the amplitude of the elliptic vibration of the first piezoelectric vibrators 410A to decelerate the rotor 300. Then, when the rotation velocity of the rotor 300 becomes equal to or lower than a second velocity Vr2, the piezoelectric vibrators 410 serving to drive the rotor 300 are switched from the first piezoelectric vibrators 410A to the second piezoelectric vibrators 410B. That is, when the rotation velocity of the rotor 300 becomes equal to or lower than the second velocity Vr2, the vibration of the second piezoelectric vibrators 410B is changed from the reciprocating vibration to the elliptic vibration and the vibration of the first piezoelectric vibrators 410A is changed from the elliptic vibration to the reciprocating vibration. Thereby, the rotor 300 may be rotated with higher torque and the rotor 300 may be smoothly decelerated. Further, the rotor 300 may be decelerated with higher energy efficiency than that in a case using the elliptic vibration of the first piezoelectric vibrators 410A and decelerating without change, and power-saving drive of the piezoelectric motor 100 can be realized.

The vibration of the first piezoelectric vibrators 410A is changed from the elliptic vibration to the reciprocating vibration for the same reason as described above in order to suppress the first piezoelectric vibrators 410A serving as brakes and instable deceleration.

Here, in the embodiment, when the piezoelectric vibrators 410 serving to drive the rotor 300 are switched from the first piezoelectric vibrators 410A to the second piezoelectric vibrators 410B, a time period T2 in which both the first and second piezoelectric vibrators 410A and 410B elliptically vibrate is provided. That is, even when the rotation velocity of the rotor 300 becomes equal to or lower than the second velocity Vr2, the elliptic vibration of the first piezoelectric vibrators 410A is continued after the second piezoelectric vibrators 410B are elliptically vibrated for a predetermined time or until the rotation velocity of the rotor 300 becomes equal to or lower than a predetermined value. The time period T2 is provided, and thereby, the vibrators may be switched from the first piezoelectric vibrators 410A to the second piezoelectric vibrators 410B without interruption of power. Accordingly, the power can be smoothly switched.

The second velocity Vr2 is not particularly limited, but may be appropriately set so that the energy efficiency may be better based on the values of the separation distances Da, Db. Further, the second velocity Vr2 may be constant or change according to e.g. a designated acceleration. For example, the control apparatus 600 may set the second velocity Vr2 to be higher as a designated deceleration is higher. Thereby, the second piezoelectric vibrators 410B may be used from the higher velocity range and the rotor may be decelerated steeply from the higher velocity range.

Further, in the embodiment, the first velocity Vr1 at which the vibrators are switched from the second piezoelectric vibrators 410B to the first piezoelectric vibrators 410A for acceleration and the second velocity Vr2 at which the vibrators are switched from the first piezoelectric vibrators 410A to the second piezoelectric vibrators 410B for deceleration are the same, however, may be different.

After the piezoelectric vibrators 410 serving to drive the rotor 300 are switched to the second piezoelectric vibrators 410B, the amplitude of the elliptic vibration of the second piezoelectric vibrators 410B is gradually decreased and, when the rotor 300 reaches the rotation position θ1, driving of both the first and second piezoelectric vibrators 410A and 410B is stopped. After the driving of the first and second piezoelectric vibrators 410A and 410B is stopped, the first and second piezoelectric vibrators 410A and 410B function as brakes and the rotation of the rotor 300 relative to the base 200 is blocked and the position of the rotor 300 is kept in the rotation position θ1. That is, according to the piezoelectric motor 100, the piezoelectric vibrators 410 function as both drive sources that rotate the rotor 300 and brakes that block the rotation of the rotor 300, and it is unnecessary to separately provide brakes in addition to the drive sources. Therefore, the piezoelectric motor 100 may be downsized.

As above, the drive control method for the piezoelectric motor 100 by the control apparatus 600 is explained. Note that the drive control method for the piezoelectric motor 100 by the control apparatus 600 is not limited to the above described method. For example, when rotation of the rotor 300 with higher torque is desired regardless of the time of acceleration, deceleration, or at a constant velocity, both the first and second piezoelectric vibrators 410A and 410B may be elliptically vibrated. Thereby, the rotor 300 may be rotated with higher torque in collaboration of the first and second piezoelectric vibrators 410A and 410B. For example, in the example shown in FIG. 8, both the first and second piezoelectric vibrators 410A and 410B are elliptically vibrated in the entire acceleration area Q1 and the entire deceleration area Q3, and the first piezoelectric vibrators 410A are elliptically vibrated and the second piezoelectric vibrators 410B are reciprocatingly vibrated in the constant velocity area Q2.

Here, Db>Da. If the first and second piezoelectric vibrators 410A and 410B are elliptically vibrated with the same amplitude, the angular velocity applied to the inner circumference side of the rotor 300 is higher than the angular velocity applied to the outer circumference side, and the first piezoelectric vibrators 410A located inside act like brakes and the second piezoelectric vibrators 410B located outside are dragged by the rotor 300. Accordingly, the smooth rotation of the rotor 300 is hindered and wear of the rotor 300 and the transmitting portions 414 may excessively proceed and drive efficiency may be degraded.

On this account, to make the angular velocities generated at the inner circumference side and the outer circumference side of the rotor 300 equal, it is preferable to set the drive force of the first piezoelectric vibrators 410A to be smaller than the drive force of the second piezoelectric vibrators 410B. A method of reducing the drive force includes e.g. a method of setting the voltages of the drive signals V1, V3 applied to the first piezoelectric vibrators 410A to be smaller than the voltages of the drive signals V1, V3 applied to the second piezoelectric vibrators 410B. Thereby, the amplitude of the elliptic vibration of the first piezoelectric vibrators 410A is smaller than the amplitude of the elliptic vibration of the second piezoelectric vibrators 410B, and the drive force of the first piezoelectric vibrators 410A is smaller than the drive force of the second piezoelectric vibrators 410B. Therefore, occurrence of the above described problem may be suppressed and the rotor 300 may be smoothly rotated.

Note that the angular velocity is substantially proportional to the voltage ratio of the drive signals V1, V3, and, for example, the magnitude of the drive signals V1, V3 applied to the first piezoelectric vibrators 410A may be determined based on the ratio of the Db and Da. That is, the magnitude of the drive signals V1, V3 applied to the first piezoelectric vibrators 410A may be set to about Da/Db of the magnitude of the drive signals V1, V3 applied to the second piezoelectric vibrators 410B. Thereby, the angular velocities generated at the inner circumference side and the outer circumference side of the rotor 300 are nearly equal and the rotor 300 can be smoothly rotated. Therefore, the wear of the rotor 300 and the transmitting portions 414 may be suppressed and the rotor 300 may be rotated with higher energy efficiency.

As described above, the piezoelectric motor has the rotor 300 as the driven member rotating around the rotation axis O and the plurality of piezoelectric vibrators 410 rotating the rotor 300 by transmitting the drive forces to the rotor 300. The plurality of piezoelectric vibrators 410 include the first piezoelectric vibrators 410A and the second piezoelectric vibrators 410B at the larger distances from the rotation axis O than the first piezoelectric vibrators 410A. The control method for the piezoelectric motor includes, for accelerating the rotor 300, when the rotation velocity of the rotor 300 is lower than the first velocity Vr, rotating the rotor 300 by transmitting the drive force of the second piezoelectric vibrators 410B to the rotor 300 and, when the rotation velocity of the rotor 300 is equal to or higher than the first velocity Vr, rotating the rotor 300 by transmitting the drive force of the first piezoelectric vibrators 410A to the rotor 300. In this manner, the piezoelectric vibrators 410 driving the rotor 300 are selected according to the rotation velocity of the rotor 300, and thereby, the rotor 300 may be rotated with good energy efficiency.

As described above, the piezoelectric vibrator 410 has the vibrating portion 411 vibrating by energization to the piezoelectric elements 420A to 420F, and the transmitting portion 414 contacting the rotor 300 and transmitting the vibration of the vibrating portion 411 to the rotor 300. When the drive force is transmitted to the rotor 300, the transmitting portion 414 is elliptically vibrated and, when the drive force is not transmitted to the rotor 300, the transmitting portion 414 is reciprocatingly vibrated in the directions closer to or away from the rotor 300. Thereby, the piezoelectric vibrators 410 not transmitting the drive force serve as brakes and lowering of the drive efficiency may be suppressed.

As described above, for acceleration of the rotor 300, when the rotation velocity of the rotor 300 becomes equal to or higher than the first velocity Vr1, the vibration of the first piezoelectric vibrators 410A is changed from the reciprocating vibration to the elliptic vibration and the vibration of the second piezoelectric vibrators 410B is changed from the elliptic vibration to the reciprocating vibration. Thereby, the rotor 300 may be accelerated with good energy efficiency.

As described above, through the state in which both the first piezoelectric vibrators 410A and the second piezoelectric vibrators 410B elliptically vibrate, the first piezoelectric vibrators 410A elliptically vibrate and the second piezoelectric vibrators 410B reciprocatingly vibrate. Thereby, the vibrators may be switched from the second piezoelectric vibrators 410B to the first piezoelectric vibrators 410A without interruption of power. Accordingly, the power can be smoothly switched.

As described above, in the state in which both the first piezoelectric vibrators 410A and the second piezoelectric vibrators 410B elliptically vibrate, the drive force of the first piezoelectric vibrators 410A is set to be smaller than the drive force of the second piezoelectric vibrators 410B. Thereby, the difference between the angular velocities generated at the inner circumference side and the outer circumference side of the rotor 300 becomes smaller, preferably zero, and the rotor 300 may be smoothly rotated with higher energy efficiency.

As described above, for deceleration of the rotor 300, when the rotation velocity of the rotor 300 becomes equal to or lower than the second velocity Vr2, the vibration of the first piezoelectric vibrators 410A is changed from the elliptic vibration to the reciprocating vibration and the vibration of the second piezoelectric vibrators 410B is changed from the reciprocating vibration to the elliptic vibration. Thereby, the rotor 300 may be decelerated with good energy efficiency.

Second Embodiment

Figure 9:
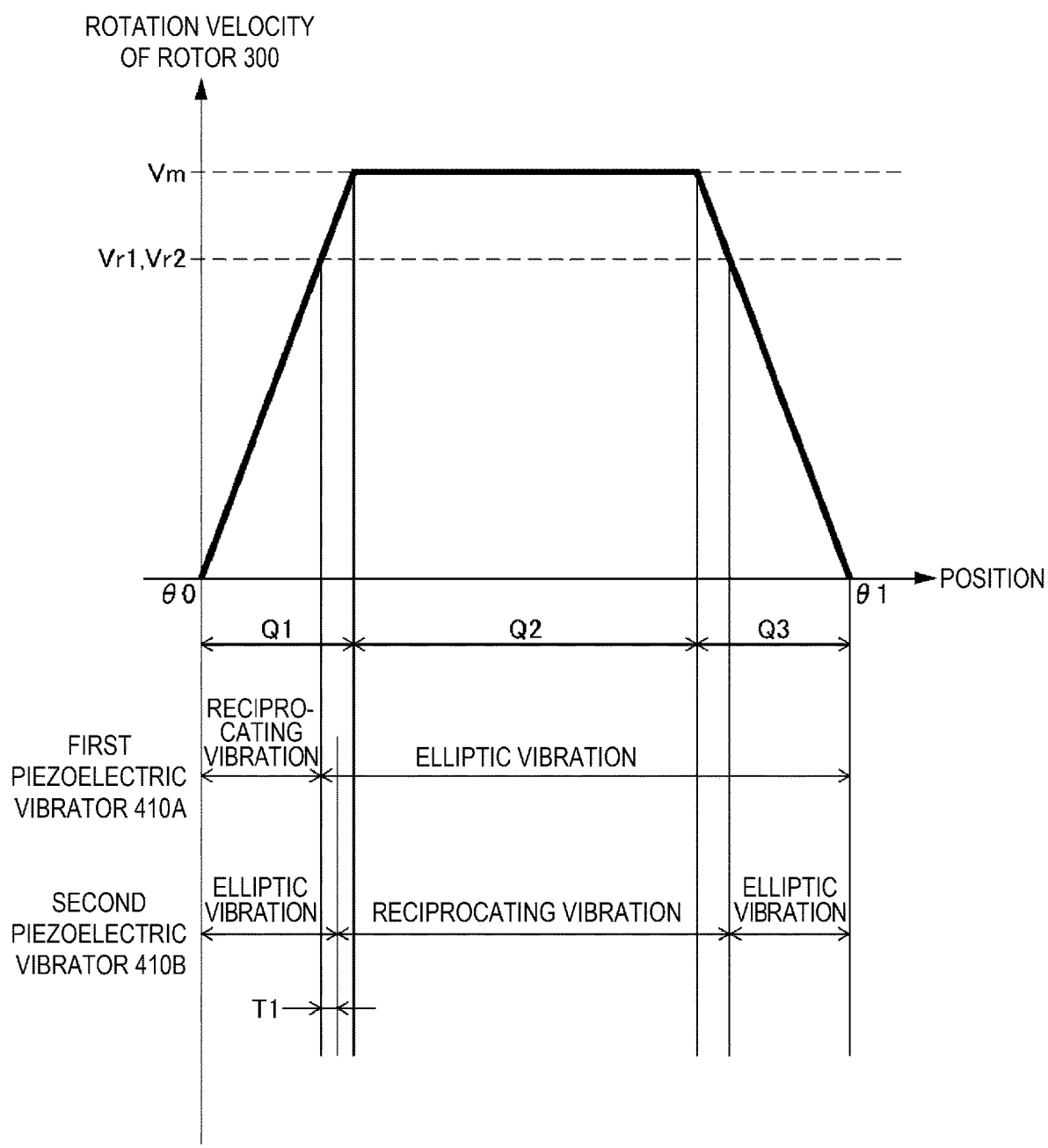
FIG. 9 shows a control method for the piezoelectric motor according to a second embodiment.

FIG. 9 shows a control method for the piezoelectric motor according to a second embodiment.

The control method for the piezoelectric motor of the embodiment is the same as the control method for the piezoelectric motor of the above described first embodiment except that the control method in the deceleration area Q3 is different. In the following description, the embodiment will be explained with a focus on the differences from the above described embodiment and the explanation of the same items will be omitted. In FIG. 9, the same configurations as those of the above described embodiment have the same signs.

Deceleration Area Q3

As shown in FIG. 9, in the deceleration area Q3 of the embodiment, first, the control apparatus 600 gradually decreases the amplitude of the elliptic vibration of the first piezoelectric vibrators 410A to decelerate the rotor 300. Then, when the rotation velocity of the rotor 300 becomes equal to or lower than the second velocity Vr2, the second piezoelectric vibrators 410B are added to the piezoelectric vibrators 410 serving to drive the rotor 300. That is, when the rotation velocity of the rotor 300 becomes equal to or lower than the second velocity Vr2, with the vibration of the first piezoelectric vibrators 410A kept as the elliptic vibration, the vibration of the second piezoelectric vibrators 410B is changed from the reciprocating vibration to the elliptic vibration and the rotor 300 is rotated in collaboration of the first and second piezoelectric vibrators 410A and 410B. Thereby, the rotor 300 may be rotated with higher torque and the rotor 300 may be decelerated by a static frictional force, and the rotor 300 may be smoothly decelerated by higher deceleration.

Note that, when the rotation velocity is equal to or lower than the second velocity Vr2, to make the angular velocities generated at the inner circumference side and the outer circumference side of the rotor 300 equal, the drive force of the first piezoelectric vibrators 410A is set to be smaller than the drive force of the second piezoelectric vibrators 410B. Thereby, the amplitude of the elliptic vibration of the first piezoelectric vibrators 410A is smaller than the amplitude of the elliptic vibration of the second piezoelectric vibrators 410B, and the drive force of the first piezoelectric vibrators 410A is smaller than the drive force of the second piezoelectric vibrators 410B. Therefore, occurrence of the problem described in the above described first embodiment may be suppressed and the rotor 300 may be smoothly rotated.

After the piezoelectric vibrators 410 serving to drive the rotor 300 are switched to the first and second piezoelectric vibrators 410A and 410B, the amplitude of the elliptic vibration of the first and second piezoelectric vibrators 410A and 410B is gradually decreased and, when the rotor 300 reaches the rotation position θ1, driving of both the first and second piezoelectric vibrators 410A and 410B is stopped.

As described above, in the control method for the piezoelectric motor of the embodiment, for deceleration of the rotor 300, both the vibrations of the first piezoelectric vibrators 410A and the second piezoelectric vibrators 410B are elliptic vibrations. Thereby, the rotor 300 may be rotated with higher torque and the rotor 300 may be smoothly decelerated by higher deceleration.

According to the second embodiment, the same effects as those of the above described first embodiment may be exerted. Note that the second embodiment is not limited to that, but, for example, in the entire deceleration area Q3, the rotor 300 may be rotated and decelerated by elliptic vibration of both the first and second piezoelectric vibrators 410A and 410B.

Third Embodiment

Figure 10:
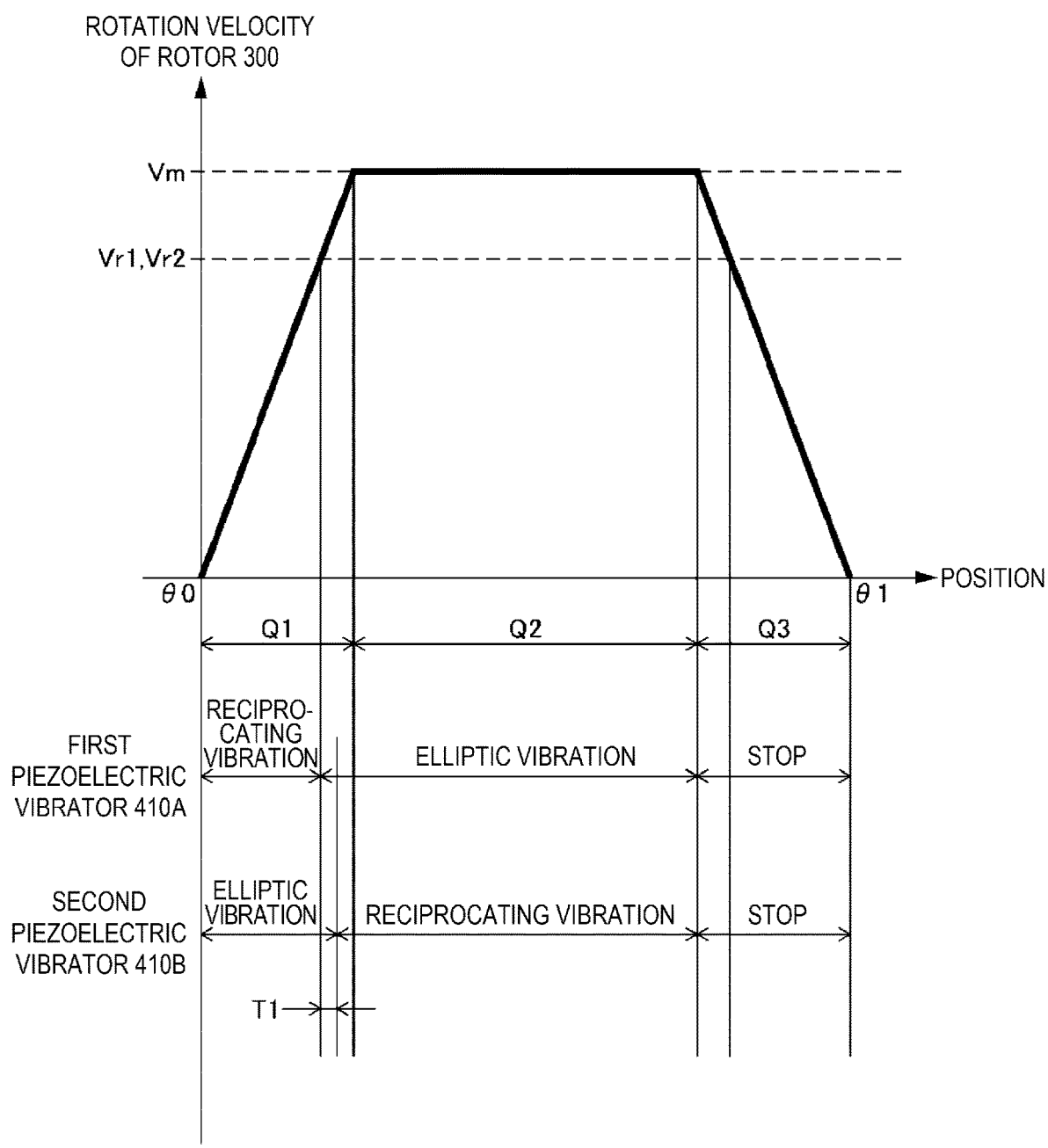
FIG. 10 shows a control method for the piezoelectric motor according to a third embodiment.

FIG. 10 shows a control method for the piezoelectric motor according to a third embodiment.

The control method for the piezoelectric motor of the embodiment is the same as the control method for the piezoelectric motor of the above described first embodiment except that the control method in the deceleration area Q3 is different. In the following description, the embodiment will be explained with a focus on the differences from the above described embodiments and the explanation of the same items will be omitted. In FIG. 10, the same configurations as those of the above described embodiments have the same signs.

Deceleration Area Q3

As shown in FIG. 10, in the deceleration area Q3 of the embodiment, first, the control apparatus 600 gradually decreases the amplitude of the elliptic vibration of the first piezoelectric vibrators 410A to decelerate the rotor 300. Then, when the rotation velocity of the rotor 300 becomes equal to or lower than the second velocity Vr2, driving of both the first and second piezoelectric vibrators 410A and 410B is stopped. Thereby, the rotor 300 is braked and the rotor 300 may be decelerated. According to the method, energization to the first and second piezoelectric vibrators 410A and 410B is unnecessary and power-saving drive of the piezoelectric motor 100 can be realized.

As described above, in the control method for the piezoelectric motor of the embodiment, for deceleration of the rotor 300, driving of the first piezoelectric vibrators 410A and the second piezoelectric vibrators 410B is stopped. Thereby, the rotor 300 is braked and the rotor 300 may be decelerated. Further, energization to the first and second piezoelectric vibrators 410A and 410B is unnecessary and power-saving drive of the piezoelectric motor 100 can be realized.

According to the third embodiment, the same effects as those of the above described first embodiment may be exerted. Note that the third embodiment is not limited to that, but, for example, in the entire deceleration area Q3, driving of both the first and second piezoelectric vibrators 410A and 410B may be stopped.

Fourth Embodiment

Figure 11:
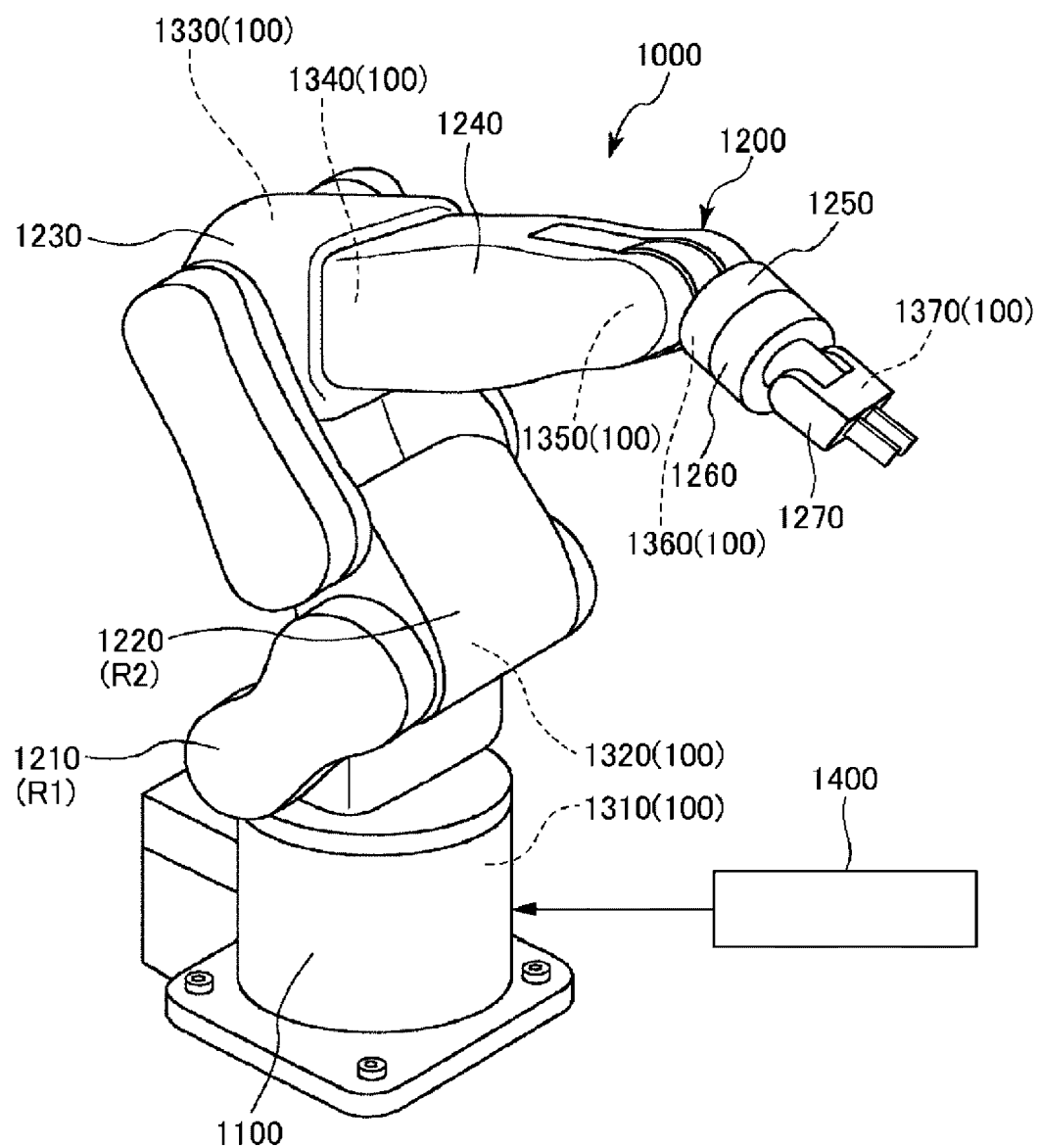
FIG. 11 is a perspective view showing a robot according to a fourth embodiment of the present disclosure.
Figure 12:
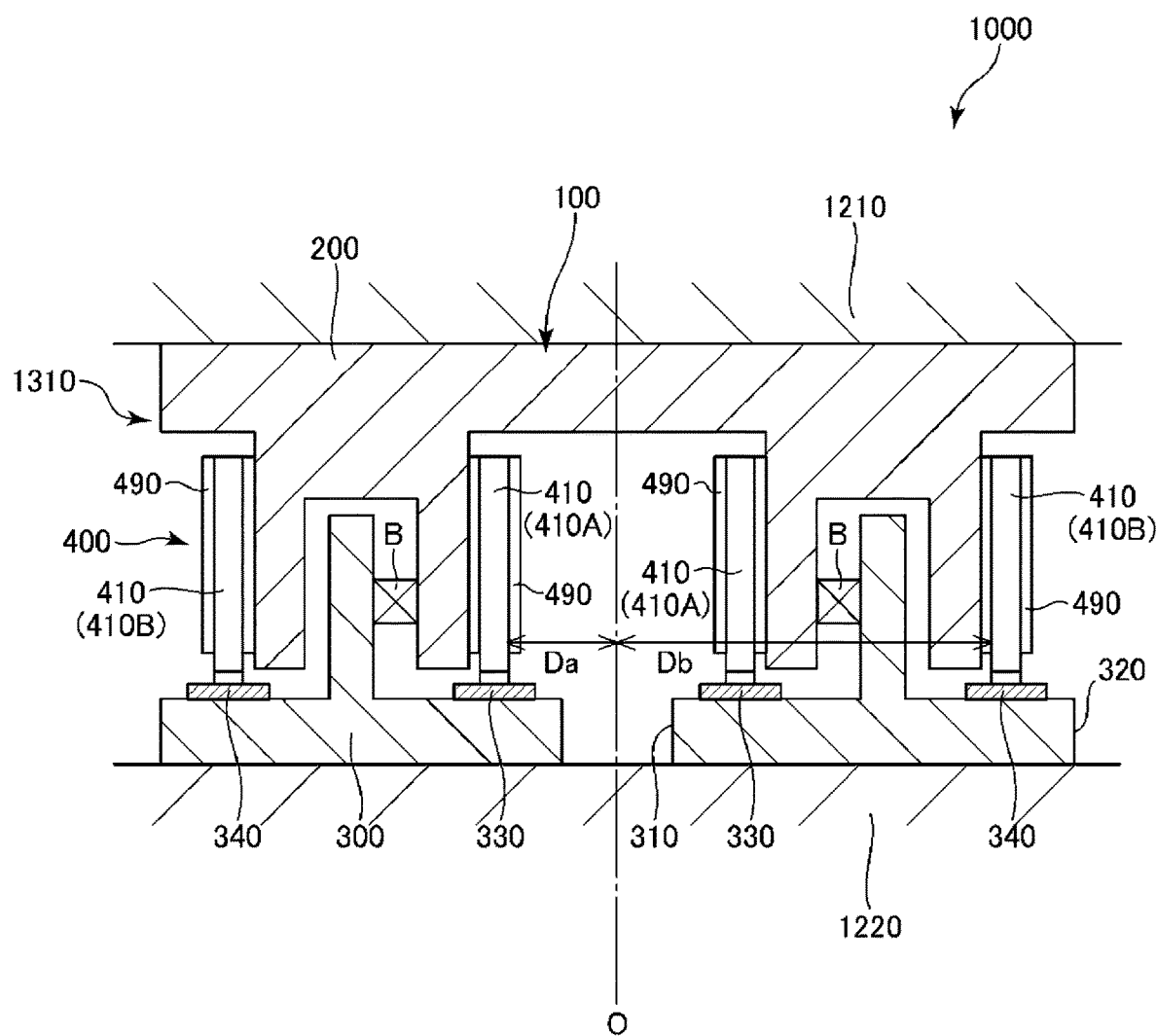
FIG. 12 is a sectional view showing a joint portion between a first arm and a second arm.

FIG. 11 is a perspective view showing a robot according to a fourth embodiment of the present disclosure. FIG. 12 is a sectional view showing a joint portion between a first arm and a second arm.

A robot 1000 shown in FIG. 11 may perform work of feeding, removing, transport, assembly, etc. of precision apparatuses and components forming the apparatuses. The robot 1000 is a six-axis articulated robot and has a base 1100 fixed to a floor or a ceiling, and a manipulator 1200 supported by the base 1100.

The manipulator 1200 is a robotic arm having a plurality of mutually coupled arms and moving at a plurality of degrees of freedom, and has a first arm 1210 pivotably coupled to the base 1100, a second arm 1220 pivotably coupled to the first arm 1210, a third arm 1230 pivotably coupled to the second arm 1220, a fourth arm 1240 pivotably coupled to the third arm 1230, a fifth arm 1250 pivotably coupled to the fourth arm 1240, a sixth arm 1260 pivotably coupled to the fifth arm 1250, and an end effector 1270 attached to the sixth arm 1260.

Note that an arbitrarily selected one of these first to sixth arms 1210 to 1260 and the end effector 1270 may be a first member and an arbitrarily selected one of the arms and the end effector except the first member may be a second member. Further, for example, when there is a plurality of members relatively movable e.g. a pair of claws for gripping a workpiece within the end effector 1270, one of the claws may be the first member and the other claw may be the second member. In the illustrated configuration, the first arm 1210 is a first member R1 and the second arm 1220 is a second member R2.

Further, the robot 1000 has a first arm pivot mechanism 1310 placed in a joint between the base 1100 and the first arm 1210 and pivoting the first arm 1210 relative to the base 1100, a second arm pivot mechanism 1320 placed in a joint between the first arm 1210 and the second arm 1220 and pivoting the second arm 1220 relative to the first arm 1210, a third arm pivot mechanism 1330 placed in a joint between the second arm 1220 and the third arm 1230 and pivoting the third arm 1230 relative to the second arm 1220, a fourth arm pivot mechanism 1340 placed in a joint between the third arm 1230 and the fourth arm 1240 and pivoting the fourth arm 1240 relative to the third arm 1230, a fifth arm pivot mechanism 1350 placed in a joint between the fourth arm 1240 and the fifth arm 1250 and pivoting the fifth arm 1250 relative to the fourth arm 1240, a sixth arm pivot mechanism 1360 placed in a joint between the fifth arm 1250 and the sixth arm 1260 and pivoting the sixth arm 1260 relative to the fifth arm 1250, and an end effector drive mechanism 1370 driving the end effector 1270. Further, the robot 1000 has a robot control unit 1400 that controls driving of these first to sixth arm pivot mechanisms 1310 to 1360 and the end effector drive mechanism 1370.

The piezoelectric motors 100 are provided in part or all of the first to sixth arm pivot mechanisms 1310 to 1360 and the end effector drive mechanism 1370 as power sources thereof, and the first to sixth arms 1210 to 1260 and the end effector 1270 as objects are driven by driving of the piezoelectric motors 100. For example, the control methods for the piezoelectric motors 100 explained in the above described first to third embodiments are applied to control of the piezoelectric motors 100. Therefore, the robot 1000 may enjoy the effects by the above described control methods for the piezoelectric motors 100 and may be driven with good energy efficiency.

Here, as described above, the piezoelectric motor 100 has the first piezoelectric vibrators 410A and the second piezoelectric vibrators 410B as the piezoelectric vibrators 410. Accordingly, the piezoelectric motor 100 also functions as a reducer by switching between the first piezoelectric vibrators 410A and the second piezoelectric vibrators 410B. That is, the piezoelectric motor 100 also serves as the reducer. Therefore, as shown in FIG. 12, in the first arm pivot mechanism 1310, the base 200 is fixed to the first arm 1210, the rotor 300 is fixed to the second arm 1220, and no reducer decelerating the rotation of the rotor 300 is provided between the rotor 300 and the second arm 1220. Accordingly, the first arm pivot mechanism 1310 may be downsized. The same applies to the second to sixth arm pivot mechanisms 1320 to 1360 and the end effector drive mechanism 1370.

Further, as described above, in the piezoelectric motor 100, the first and second piezoelectric vibrators 410A and 410B stop driving thereof, and thereby, block the rotation of the rotor 300 and also function as brakes that keep the relative positions of the coupled arms. That is, the first and second piezoelectric vibrators 410A and 410B also serve as brakes that block the rotation of the rotor 300. Therefore, as shown in FIG. 12, in the first arm pivot mechanism 1310, no other brake blocking the rotation of the rotor 300 is provided than the piezoelectric motor 100. Accordingly, the first arm pivot mechanism 1310 may be downsized. The same applies to the second to sixth arm pivot mechanisms 1320 to 1360 and the end effector drive mechanism 1370.

As described above, the robot 1000 has the first arm 1210 as the first member R1 and the second arm 1220 as the second member R2 coupled to each other, and the piezoelectric motor 100 that displaces the second arm 1220 relative to the first arm 1210. Accordingly, the robot 1000 may enjoy the effects of the piezoelectric motor 100 and driving with good energy efficiency can be performed.

Further, as described above, the piezoelectric motor 100 also serves as the reducer. Accordingly, it is not necessary to provide another reducer than the piezoelectric motor 100 and the robot 1000 may be downsized.

Furthermore, as described above, in the piezoelectric motor 100, the piezoelectric vibrators 410 also serve as the brakes blocking the rotation of the rotor 300. Accordingly, it is not necessary to provide another brake than the piezoelectric motor 100 and the robot 1000 may be downsized.

According to the fourth embodiment, the same effects as those of the above described first embodiment may be exerted.

As above, the control method for the piezoelectric motor and the robot according to the present disclosure are explained based on the illustrated embodiments, however, the present disclosure is not limited to those. The configurations of the respective parts may be replaced by any configurations having the same functions. Or, any other configuration may be added to the present disclosure. Or, the respective embodiments may be appropriately combined. In the above described embodiments, the configuration in which the control method for the piezoelectric motor is applied to the robot is explained, however, the control method for the piezoelectric motor may be applied to various other electronic devices requiring drive forces than the robot e.g. a printer, a projector, etc.

What is claimed is:

1. A control method for a piezoelectric motor including a driven member rotating around a rotation axis, and a plurality of piezoelectric vibrators rotating the driven member by transmitting drive forces to the driven member, the plurality of piezoelectric vibrators including a first piezoelectric vibrator and a second piezoelectric vibrator at a larger distance from the rotation axis than the first piezoelectric vibrator, the control method comprising, for acceleration of the driven member, rotating the driven member by the drive force of the second piezoelectric vibrator when a rotation velocity of the driven member is lower than a first velocity, and rotating the driven member by the drive force of the first piezoelectric vibrator when the rotation velocity of the driven member is equal to or higher than the first velocity.

2. The control method for the piezoelectric motor according to claim 1, wherein the piezoelectric vibrator has a vibrating portion vibrating by energization to a piezoelectric element, and a transmitting portion contacting the driven member and transmitting vibration of the vibrating portion to the driven member, when a drive force is transmitted to the driven member, the transmitting portion is elliptically vibrated, and, when a drive force is not transmitted to the driven member, the transmitting portion is reciprocatingly vibrated in directions closer to or away from the driven member.

3. The control method for the piezoelectric motor according to claim 2, wherein for acceleration of the driven member, a vibration of the first piezoelectric vibrator is changed from a reciprocating vibration to an elliptic vibration and the vibration of the second piezoelectric vibrator is changed from an elliptic vibration to a reciprocating vibration when the rotation velocity of the driven member becomes equal to or higher than the first velocity.

4. The control method for the piezoelectric motor according to claim 3, wherein through a state in which both the first piezoelectric vibrator and the second piezoelectric vibrator elliptically vibrate, the first piezoelectric vibrator elliptically vibrates and the second piezoelectric vibrator reciprocatingly vibrates.

5. The control method for the piezoelectric motor according to claim 2, wherein in a state in which both the first piezoelectric vibrator and the second piezoelectric vibrator elliptically vibrate, the drive force of the first piezoelectric vibrator is set to be smaller than the drive force of the second piezoelectric vibrator.

6. The control method for the piezoelectric motor according to claim 2, wherein for deceleration of the driven member, a vibration of the first piezoelectric vibrator is changed from an elliptic vibration to a reciprocating vibration and a vibration of the second piezoelectric vibrator is changed from a reciprocating vibration to an elliptic vibration when the rotation velocity of the driven member becomes equal to or lower than a second velocity.

7. The control method for the piezoelectric motor according to claim 2, wherein for deceleration of the driven member, vibrations of both the first piezoelectric vibrator and the second piezoelectric vibrator are elliptic vibrations.

8. The control method for the piezoelectric motor according to claim 2, wherein
for deceleration of the driven member, driving of the first piezoelectric vibrator and the second piezoelectric vibrator is stopped.

9. A robot comprising:
a first member and a second member coupled to each other; and
a piezoelectric motor driven under control by the control method for the piezoelectric motor according to claim 1, and displacing the second member relative to the first member.

* * * * *